US012768541B2

(12) United States Patent
Cadima

(10) Patent No.: US 12,768,541 B2
(45) Date of Patent: Oct. 20, 2026

(54) COOKTOP APPLIANCE AND TEMPERATURE LIMITING COIL

(71) Applicant: Haier US Appliance Solutions, Inc., Wilmington, DE (US)

(72) Inventor: Paul Bryan Cadima, Crestwood, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 708 days.

(21) Appl. No.: 18/302,457

(22) Filed: Apr. 18, 2023

(65) Prior Publication Data

US 2024/0353109 A1 Oct. 24, 2024

(51) Int. Cl.

*F24C 7/08* (2006.01)
*F24C 7/06* (2006.01)
*G01K 1/143* (2021.01)
*H05B 3/76* (2006.01)

(52) U.S. Cl.

CPC .............. *F24C 7/087* (2013.01); *F24C 7/067* (2013.01); *G01K 1/143* (2013.01); *H05B 3/76* (2013.01); *H05B 2213/07* (2013.01)

(58) Field of Classification Search

CPC ............................ F24C 7/087; H05B 2213/07
See application file for complete search history.

(56) References Cited

U.S. PATENT DOCUMENTS

| | | | | |
|---|---|---|---|---|
| 10,962,232 | B2 | 3/2021 | Pasqual et al. | |
| 11,516,890 | B2 | 11/2022 | Cadima | |
| 11,523,471 | B2 | 12/2022 | Cadima | |
| 2018/0238559 | A1* | 8/2018 | Pasqual | F24C 15/105 |
| 2019/0113238 | A1* | 4/2019 | Gomez | F24C 15/105 |
| 2021/0080115 | A1* | 3/2021 | Cadima | H05B 3/76 |
| 2021/0222883 | A1* | 7/2021 | Cadima | F24C 7/088 |
| 2021/0222886 | A1* | 7/2021 | Cadima | H05B 1/0216 |
| 2022/0018545 | A1* | 1/2022 | Cadima | F24C 7/088 |
| 2022/0159790 | A1* | 5/2022 | Cadima | H05B 3/746 |
| 2023/0070713 | A1* | 3/2023 | Reyes Soto | H05B 3/28 |

* cited by examiner

*Primary Examiner* — John J Norton
(74) *Attorney, Agent, or Firm* — Dority & Manning, P.A.

(57) ABSTRACT

An electric cooktop appliance and a heating coil assembly are provided. The heating coil assembly includes a sensor support assembly at which a thermostat is positioned. The sensor support assembly includes a shroud cover including a top wall and a sidewall extending downward from the top wall. The top wall includes an upper surface facing upward and a non-flat lower surface facing downward toward the thermostat. A spring bracket is configured to bias the shroud cover upwardly and includes a mounting plate and a biasing arm. The spring bracket forms a central recess at which the thermostat is positioned. The lower surface of the shroud cover forms a non-flat surface. The mounting plate of the spring bracket includes a contact portion corresponding to the non-flat surface at the lower surface of the shroud cover.

19 Claims, 12 Drawing Sheets

COOKTOP APPLIANCE AND TEMPERATURE LIMITING COIL

FIELD

The present subject matter relates generally to cooktop appliances with electric heating elements.

BACKGROUND

Certain cooktop appliances include electric heating elements and temperature sensing medallions that are required to spring upward to contact cookware utensils without preventing the cookware from contacting the heating element. The spring force is generally small since some cookware may be relatively lightweight and a relatively large spring force may prevent the cookware from contacting the heating element.

The deflection of the medallion and travel through its stroke must be free of binding to allow for low spring forces to always urge the medallion to contact the bottom of the cookware. During assembly of the spring and medallion, clearances and tolerances between the parts may allow the medallion to be captured to the urging spring with an eccentricity between the spring and the medallion. The eccentricity may cause the medallion to rest about the heating coil shroud with eccentricity such that, during downward deflection of the medallion from the weight of the cookware, the medallion may drag at a location about the shroud and consequently bind. The binding causes lack of contact between the cookware and the heating element, which results in poor cooking performance (e.g., inadequate or uneven heat transfer to the cookware).

A cooktop appliance and electric heating coil assembly that addresses one or more of the aforementioned issues would be advantageous and beneficial.

BRIEF DESCRIPTION

Aspects and advantages of the invention will be set forth in part in the following description, or may be obvious from the description, or may be learned through practice of the invention.

An aspect of the present disclosure is directed to a heating coil assembly for a cooktop appliance. The heating coil assembly includes a heating element including a coil section, a thermostat, and a sensor support assembly at which the thermostat is positioned. The sensor support assembly includes a shroud cover having a top wall and a sidewall extending downward from the top wall. The top wall includes an upper surface facing upward and a non-flat lower surface facing downward toward the thermostat. A spring bracket is configured to bias the shroud cover upwardly. The spring bracket includes a mounting plate and a biasing arm. The spring bracket forms a central recess at which the thermostat is positioned. The mounting plate of the spring bracket includes a contact portion corresponding to the non-flat surface at the lower surface of the shroud cover.

Another aspect of the present disclosure is directed to an electric cooktop appliance. The cooktop appliance includes a heating element including a coil section, a thermostat, and a sensor support assembly at which the thermostat is positioned. The sensor support assembly includes a shroud cover having a top wall and a sidewall extending downward from the top wall. The top wall includes an upper surface facing upward and a non-flat lower surface facing downward toward the thermostat. A spring bracket is configured to bias the shroud cover upwardly. The spring bracket includes a mounting plate and a biasing arm. The spring bracket forms a central recess at which the thermostat is positioned. The mounting plate of the spring bracket includes a contact portion corresponding to the non-flat surface at the lower surface of the shroud cover.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
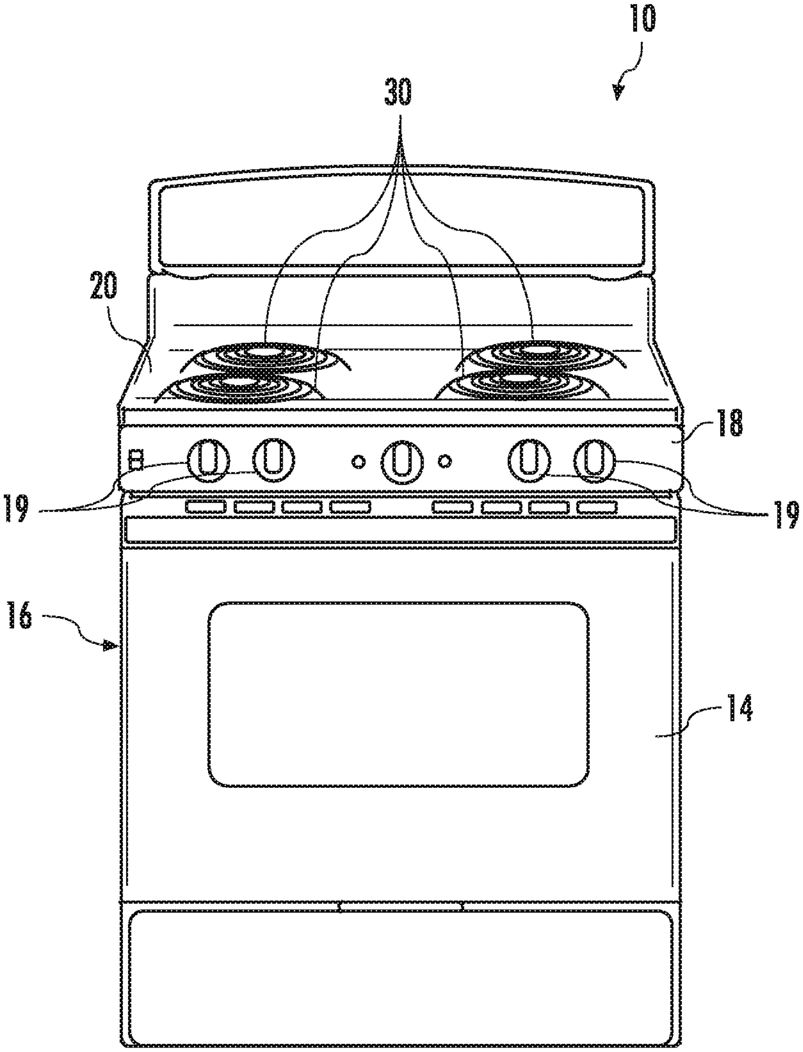
FIG. 1 provides a front perspective view of a range appliance including an electric cooktop in accordance with aspects of the present disclosure.
Figure 2:
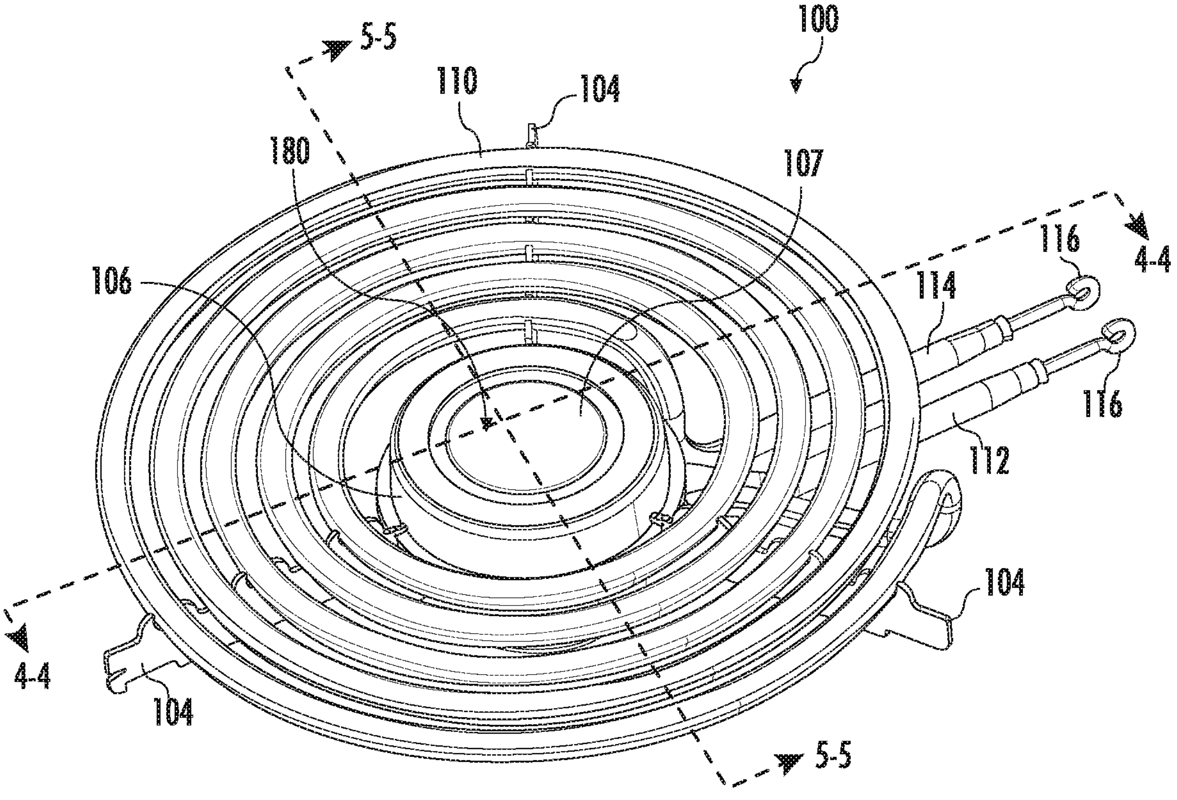
FIG. 2 provides a perspective view of an electric heating coil assembly in accordance with aspects of the present disclosure.
Figure 3:
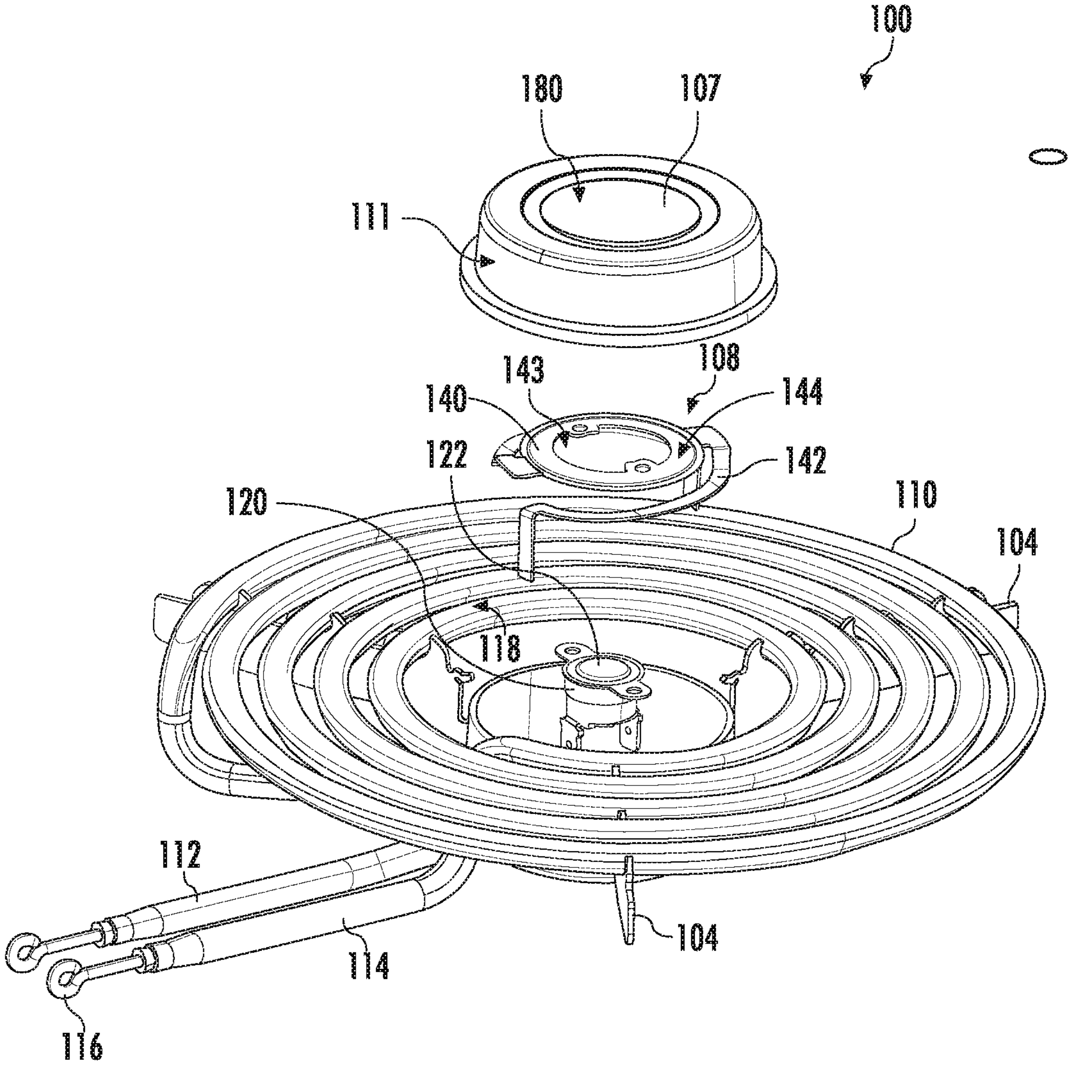
FIG. 3 provides an exploded perspective view of an electric heating coil assembly in accordance with aspects of the present disclosure.
Figure 4:
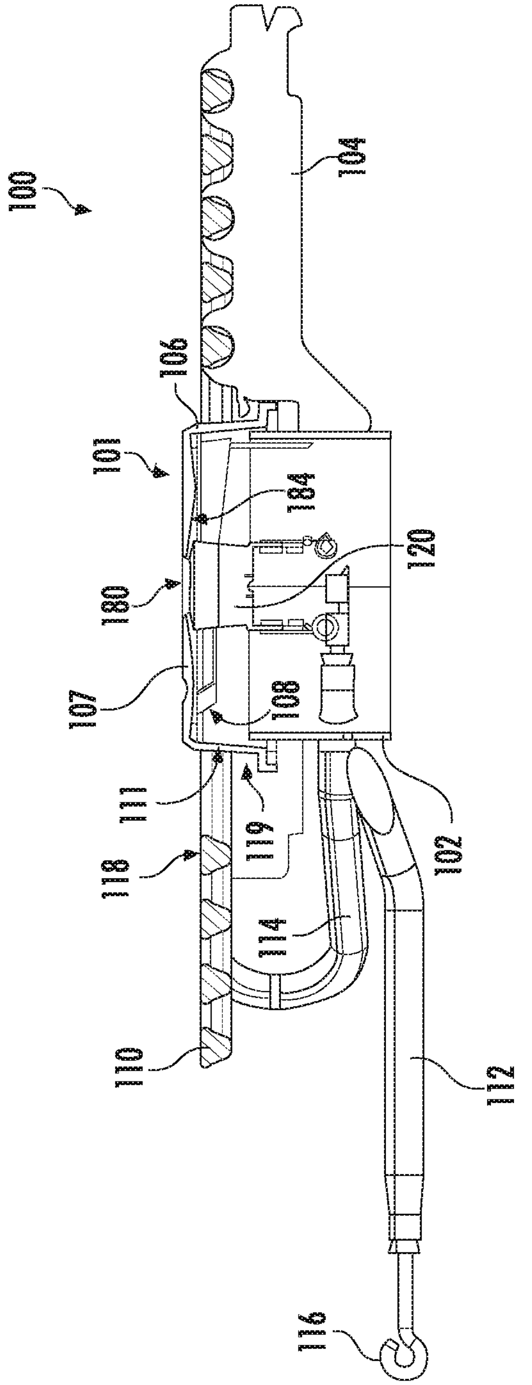
FIG. 4 provides a side cutaway view along Section 4-4 in FIG. 2 of an electric heating coil assembly in accordance with aspects of the present disclosure.
Figure 5:
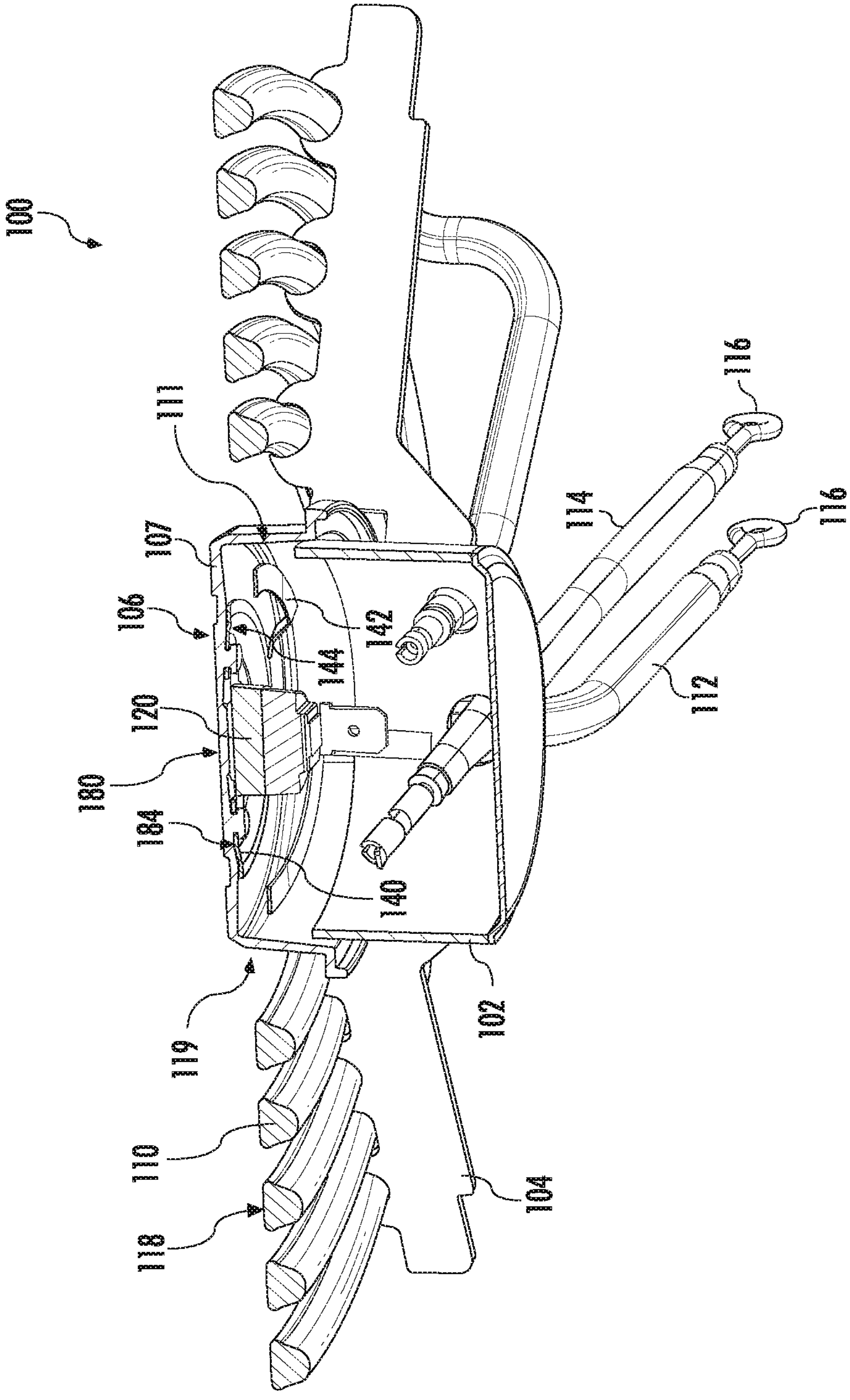
FIG. 5 provides a cutaway perspective view along Section 5-5 in FIG. 2 of an electric heating coil assembly in accordance with aspects of the present disclosure.
Figure 6:
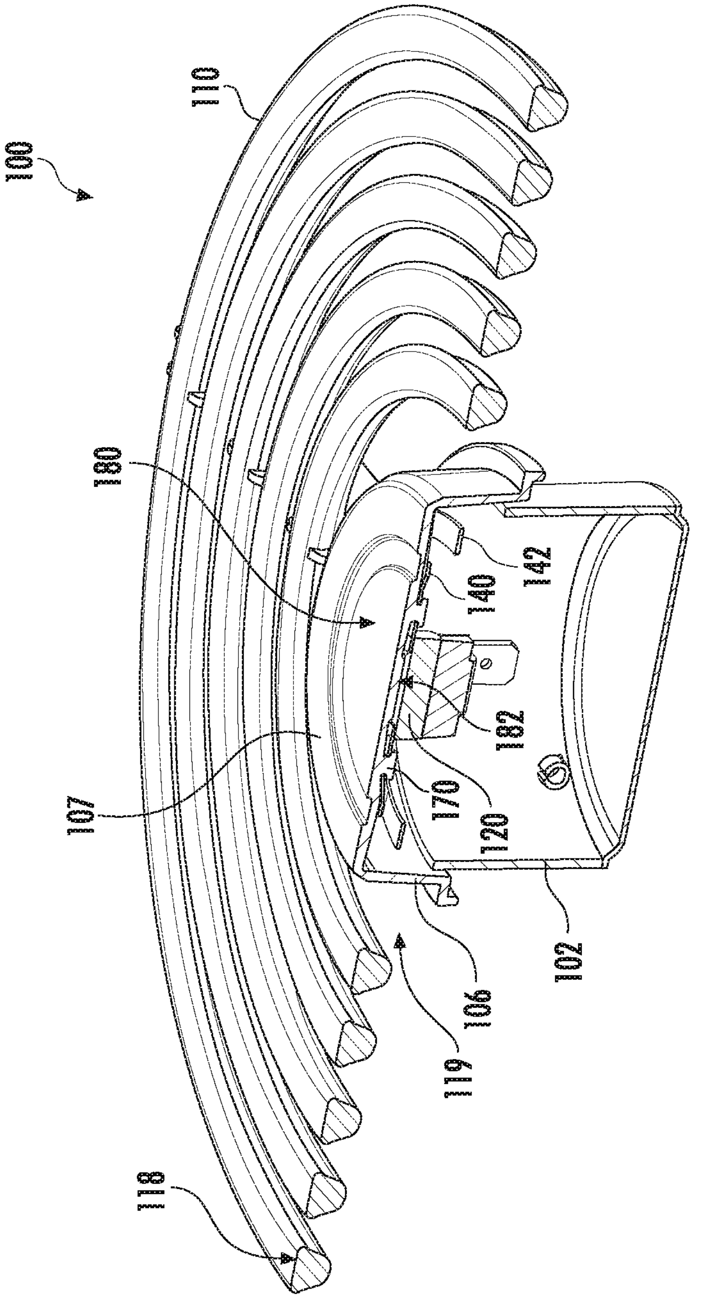
FIG. 6 provides a cutaway perspective view along Section 5-5 in FIG. 2, with details omitted for clarity, of an electric heating coil assembly in accordance with aspects of the present disclosure.
Figure 7:
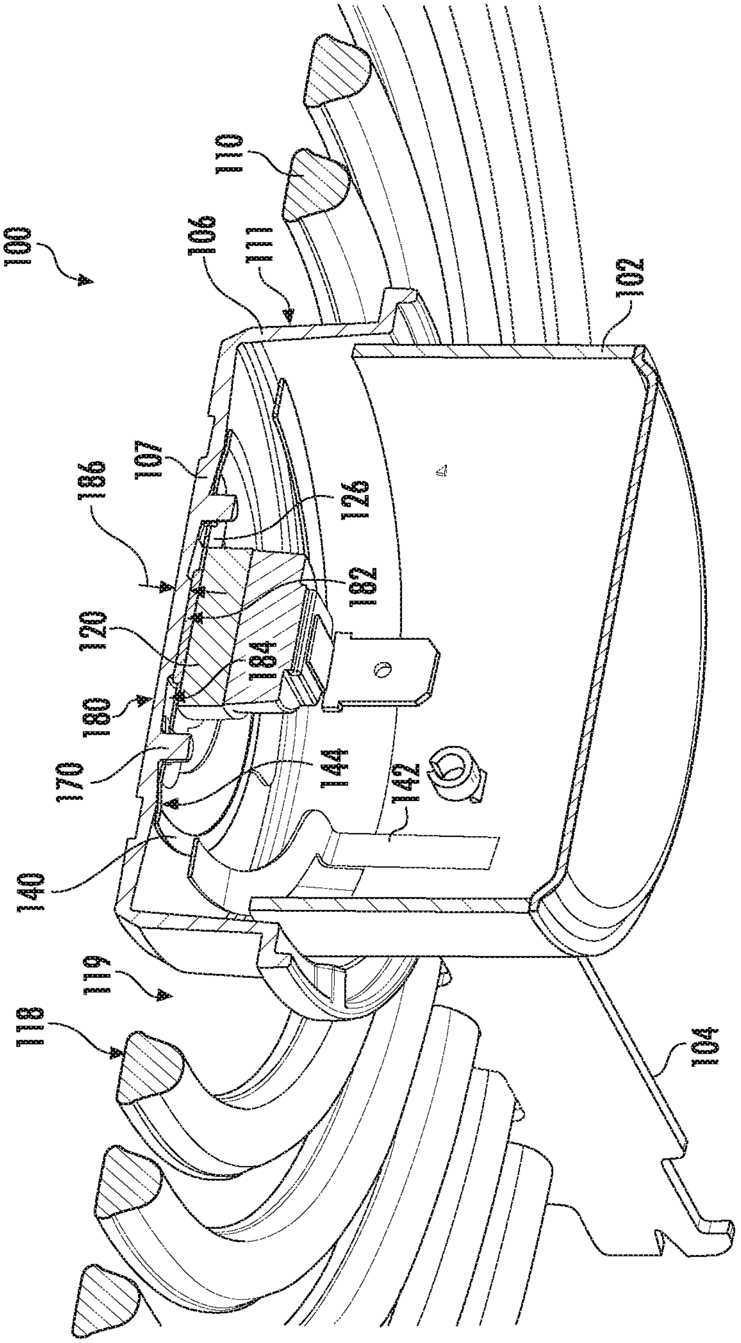
FIG. 7 provides a cutaway perspective view along Section 5-5 in FIG. 2, with details omitted for clarity, of an electric heating coil assembly in accordance with aspects of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the term "or" is generally intended to be inclusive (i.e., "A or B" is intended to mean "A or B or both"). The terms "first," "second," and "third" may be used interchangeably to distinguish one component from another and are not intended to signify location or importance of the individual components. The terms "upstream" and "downstream" refer to the relative flow direction with respect to fluid flow in a fluid pathway. For example, "upstream" refers to the flow direction from which the fluid flows, and "downstream" refers to the flow direction to which the fluid flows.

Embodiments of a cooktop appliance and an electric heating coil assembly that addresses one or more of the aforementioned issues are provided. Embodiments of the cooktop appliance, such as range appliance 10 and electric heating coil assembly 100, and sensor support assembly 101 provided herein may promote concentricity of a medallion during assembly such that, during downward deflection of the medallion from the weight of the cookware, undesired binding of the medallion may be mitigated, and concentric positioning of the thermostat for measuring heating coil or cookware utensil temperature is promoted.

Turning now to the drawings, FIG. 1 provides a front, perspective view of a range appliance 10 according to exemplary embodiments of the present disclosure. Range appliance 10 is provided by way of example only and is not intended to limit the present subject matter to the particular arrangement shown in FIG. 1. Thus, the present subject matter may be used with other cooktop appliance configurations (e.g., double oven range appliances, standalone cooktop appliances, etc.).

Generally, a top panel 20 of range appliance 10 includes one or more heating elements 30. Heating elements 30 may be, for example, electrical resistive heating elements. Range appliance 10 may include only one type of heating element 30, or range appliance 10 may include a combination of different types of heating elements 30, such as a combination of electrical resistive heating elements and gas burners. Further, heating elements 30 may have any suitable shape and size, and a combination of heating elements 30 of different shapes and sizes may be used.

Generally, each heating element 30 defines a heating zone 32 on which a cooking utensil, such as a pot, pan, or the like, may be placed to cook or heat food items placed in the cooking utensil. In some embodiments, range appliance 10 also includes a door 14 that permits access to a cooking chamber 16 of range appliance 10 (e.g., for cooking or baking of food items therein). A control panel 18 having controls 19 permits a user to make selections for cooking of food items—although shown on a front panel of range appliance 10, control panel 18 may be positioned in any suitable location. Controls 19 may include buttons, knobs, and the like, as well as combinations thereof. As an example, a user may manipulate one or more controls 19 to select a temperature or a heat or power output for each heating element 30.

Turning now to FIGS. 2 through 12, views of an embodiment of an electric heating coil assembly 100 and sensor support assembly 101 of range appliance 10, such as an electric resistance heating coil, are provided. Heating coil assembly 100 may be used as one or more of heating elements 30 in range appliance 10. However, while described in greater detail below in the context of range appliance 10, it will be understood that heating coil assembly 100 may be used in or with any suitable cooktop appliance in alternative example embodiments. As discussed in greater detail below, heating coil assembly 100 includes features for facilitating conductive heat transfer between a thermostat 120 (e.g., bimetallic thermostat) and a utensil positioned on heating coil assembly 100.

As shown, some embodiments of heating coil assembly 100 include a spiral wound heating element 110, such as a sheathed heating element. Heating element 110 may include a first coil section 112 and a second coil section 114. In certain embodiments, heating element 110 also has a pair of terminals 116. Each of first and second coil sections 112, 114 may be directly coupled or connected to a respective terminal 116. A voltage differential across terminals 116 induces an electrical current through heating element 110, and heating element 110 may increase in temperature by resisting the electrical current through heating element 110.

Within the heating zone 32, a sensor support assembly 101, including thermostat 120, is positioned. When assembled, thermostat 120 is connected, for example, in series between first and second coil sections 112, 114 of heating element 110. Thermostat 120 opens and closes in response to a temperature of thermostat 120. For example, thermostat 120 may be spring loaded such that a distal end 122 of thermostat 120 is urged away from a top surface 118 of heating element 110. Thus, distal end 122 of thermostat 120 may be urged towards a utensil (not shown) positioned on top surface 118 of heating element 110. Thermostat 120 may measure the temperature of the utensil on top surface 118 of heating element 110 due to heat transfer between the utensil and thermostat 120. As discussed in greater detail below, heating coil assembly 100 includes features for facilitating conductive heat transfer between the utensil on top surface 118 of heating element 110 and thermostat 120.

Sensor support assembly 101 may also include a shroud 102 and coil support arms 104. Coil support arms 104 extend (e.g., radially) from shroud 102, and heating element 110 is positioned on and supported by coil support arms 104. Coil support arms 104 may rest on top panel 20 to support heating coil assembly 100 on top panel 20. A shroud cover 106 (i.e., conductive cap or medallion) may be disposed radially inward from the first and second coil sections 112, 114. Shroud cover 106 may be positioned on or above shroud 102. Additionally or alternatively, shroud cover 106 may extend over shroud 102. In particular, a top of shroud 102 may be nested in shroud cover 106.

As shown, shroud cover 106 may include a top wall 107 and a sidewall 111 that extends downward from top wall 107. For instance, sidewall 111 may extend circumferentially about top wall 107 (e.g., at an outer perimeter thereof). Optionally, a nesting rim may be disposed on sidewall 111 (e.g., therebelow) or extend circumferentially around sidewall 111 to rest about shroud 102 and prevent shroud cover 106 from moving (e.g., radially) relative to shroud 102. Nonetheless, when assembled, shroud cover 106 may generally be spaced apart from shroud 102. For instance, an air gap may be defined between shroud cover 106 and shroud 102 (e.g., such that contact or conductive thermal communication is prevented between the two).

Generally, top wall 107 of shroud cover 106 defines an upper surface 180 and a lower surface 182. When assembled, upper surface 180 faces upwards (e.g., to contact a utensil on heating coil assembly 100). Lower surface 182 faces downwards (e.g., towards thermostat 120 or shroud 102). When assembled, thermostat 120 may be attached (e.g., fixed relative to) a portion of a shroud cover 106. In particular, thermostat 120 may be in conductive thermal communication (e.g., direct or indirect contact) with shroud cover 106 at lower surface 182 while “floating” within shroud 102. At least a portion of shroud cover 106 may be positioned above a top portion of thermostat 120 (e.g., distal end 122) and a bottom portion of thermostat 120 (e.g., an interior end 123 opposite of distal end 122). During use, shroud cover 106 generally facilitates or directs heat from a utensil thereon to thermostat 120. Nonetheless, shroud 102 may shield thermostat 120 from at least a portion of the heat generated at heating element 110. Optionally, shroud 102 may be formed from a relatively low thermal conductivity metal (e.g., steel or a steel alloy). Additionally or alternatively, shroud cover 106 may be formed from a relatively high thermal conductivity metal (e.g., aluminum, copper, a copper alloy, or an aluminum alloy).

A spring bracket 108 biases shroud cover 106 upwardly. As shown, spring bracket 108 may include a mounting plate 140 and one or more biasing arms 142 extending therefrom. The biasing arm 142 may extend helically downward from the mounting plate 140. The biasing arm 142 may include one or more substantially straight portions. Spring bracket 108 may define a central recess 143 within which thermostat 120 may be held or nested. For instance, spring bracket 108 may include the mounting plate 140 at which the recess 143 is formed. When assembled, shroud cover 106 is supported on or attached to mounting plate 140. For instance, shroud cover 106 may rest directly on mounting plate 140. Additionally or alternatively, shroud cover 106 may be attached to mounting plate 140. For instance, mounting plate 140 can be welded, clipped, or otherwise attached to lower surface 182 of shroud cover 106 with mechanical fasteners (e.g., screws, rivets, stud welding, mated threading, etc.), or a combination thereof.

In some such embodiments, one or more support stakes 170 may extend downward from lower surface 182 and be joined to mounting plate 140. Spring bracket 108 may include an opening 148 through which support stakes 170 may extend. Openings 148 may be formed at the mounting plate 140, such as to allow the mounting plate 140 to fasten to the lower surface 182 of the top wall 107. The spring bracket 108 may be joined to the shroud cover 106 via riveting, such as the support stake 170 forming integral rivets extending through the openings 148 and flared to affix the spring bracket 108 to the shroud cover 106 at the top wall 107. However, it should be appreciated that other embodiments may include other mechanical fasteners or fastening methods, such as, but not limited, to, one or more rivets, screws, or other suitable mechanical fasteners. Because top wall 107 is positioned on mounting plate 140, shroud cover 106 may also be urged away from top surface 118 of heating element 110.

Figure 8:
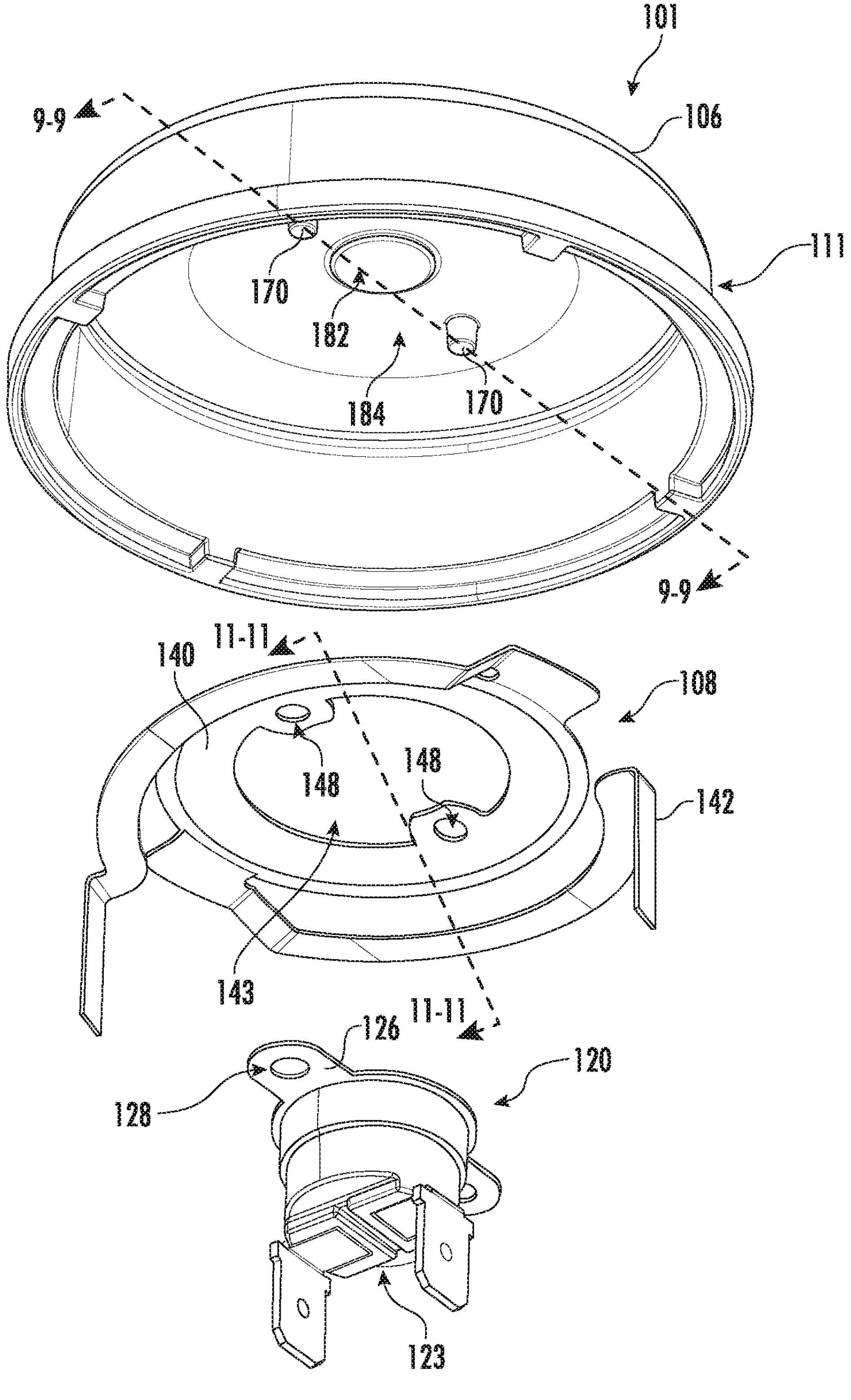
FIG. 8 provides an exploded perspective view of a sensor support assembly for an electric heating coil assembly in accordance with aspects of the present disclosure.

Referring to FIG. 8, in some embodiments, the thermostat 120 includes a fastening platform 126 at which an opening 128 is formed. The opening 128 may correspond to opening 148 at the spring bracket 108 and the support stakes 170. For instance, support stakes 170 may extend through openings 128, 148, such as to attach the thermostat 120 and the spring bracket 108 to the top wall 107 such as described above.

Biasing arms 142 may be resilient members, which generally urge mounting plate 140 upward. Spring bracket 108, including biasing arms 142, may be formed from any suitable high temperature material. For instance, spring bracket 108 is formed of a stainless steel, full hard, or spring tempered material. Spring bracket 108 can be formed of other suitable high temperature materials as well.

During use, top wall 107 of shroud cover 106 may generally act as a heat transfer disk to transfer heat through top wall 107 from upper surface 180 to lower surface 182. As shown, top wall 107 is positioned on thermostat 120 at distal end 122 of thermostat 120. In particular, distal end 122 may be held against the lower surface 182 of top wall 107. Thus, top wall 107 may be in direct, thermal, conductive communication with thermostat 120 at lower surface 182.

Shroud cover 106 or thermostat 120 may be positioned concentrically with a center 119 of heating element 110. Center 119 of heating element 110 may be open, and heating element 110 may extend circumferentially around heat shroud cover 106 or thermostat 120 at center 119.

Generally, top wall 107 may be sized to facilitate conductive heat transfer between a utensil on top surface 118 of heating element 110 and thermostat 120. Additionally or alternatively, diameter of top wall 107 may be larger than a maximum diameter defined by a base of thermostat 120. Additionally or alternatively, the diameter of top wall 107 may be less than a diameter of center 119 of heating element 110. The sizing of top wall 107 relative to thermostat 120 may advantageously assist conductive heat transfer from the utensil on top surface 118 of heating element 110 to thermostat 120.

As shown, thermostat 120 may be attached directly to top wall 107. Specifically, lower surface 182 may be attached (e.g., directly) to thermostat 120 at distal end 122 (e.g., at upper-facing surface 150). For instance, thermostat 120 can be welded, clipped, or otherwise attached to lower surface 182 of shroud cover 106 with mechanical fasteners (e.g., screws, rivets, weld studs, mated threading, etc.), or a combination thereof.

Figure 9:
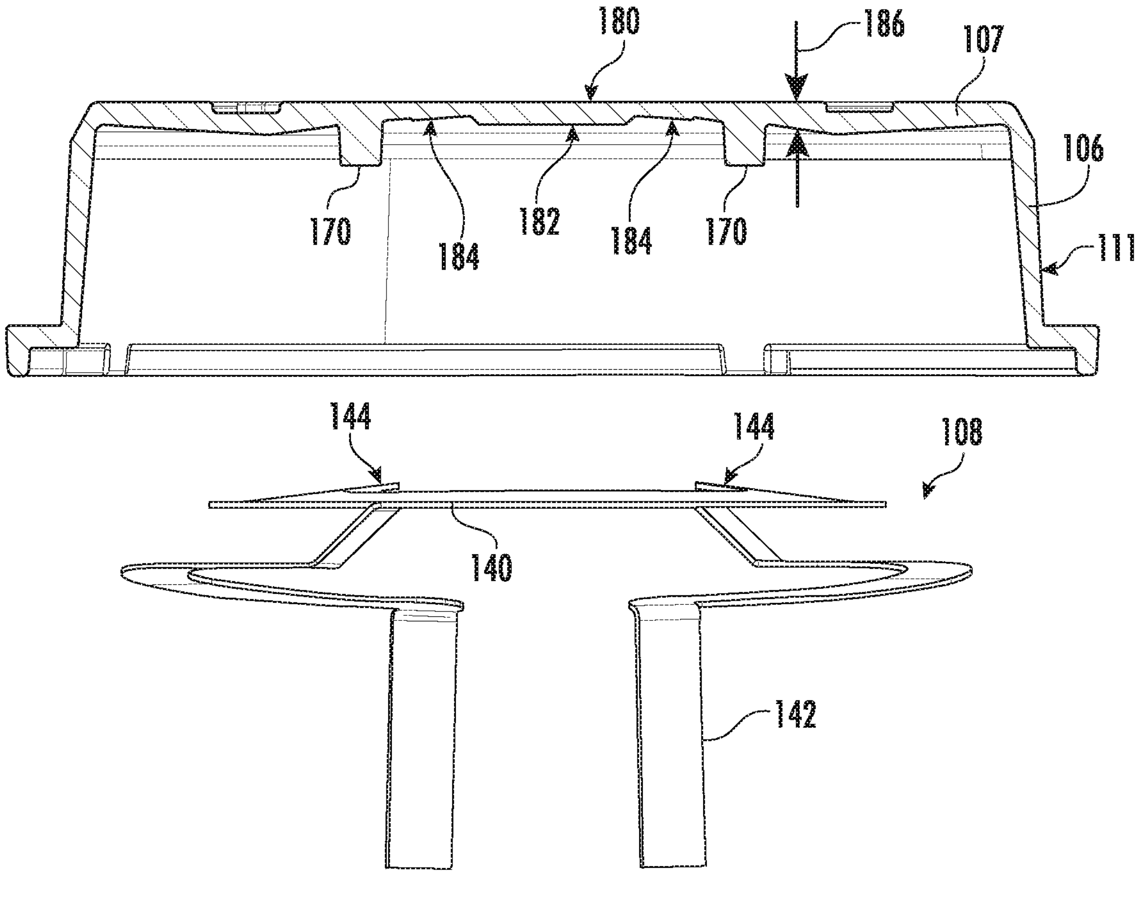
FIG. 9 provides a cross-sectional side view along Section 9-9 in FIG. 8, with details omitted for clarity, of a portion of an embodiment of an electric heating coil assembly in accordance with aspects of the present disclosure.
Figure 10:
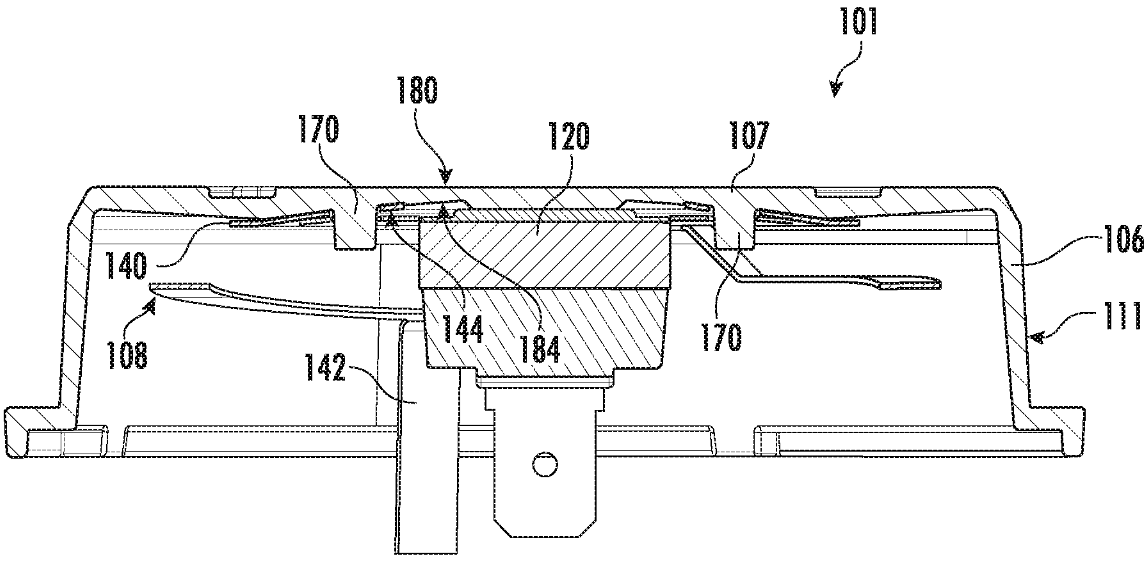
FIG. 10 provides a cutaway side view along Section 9-9 in FIG. 8 of a sensor support assembly for an electric heating coil assembly in accordance with aspects of the present disclosure.
Figure 11:
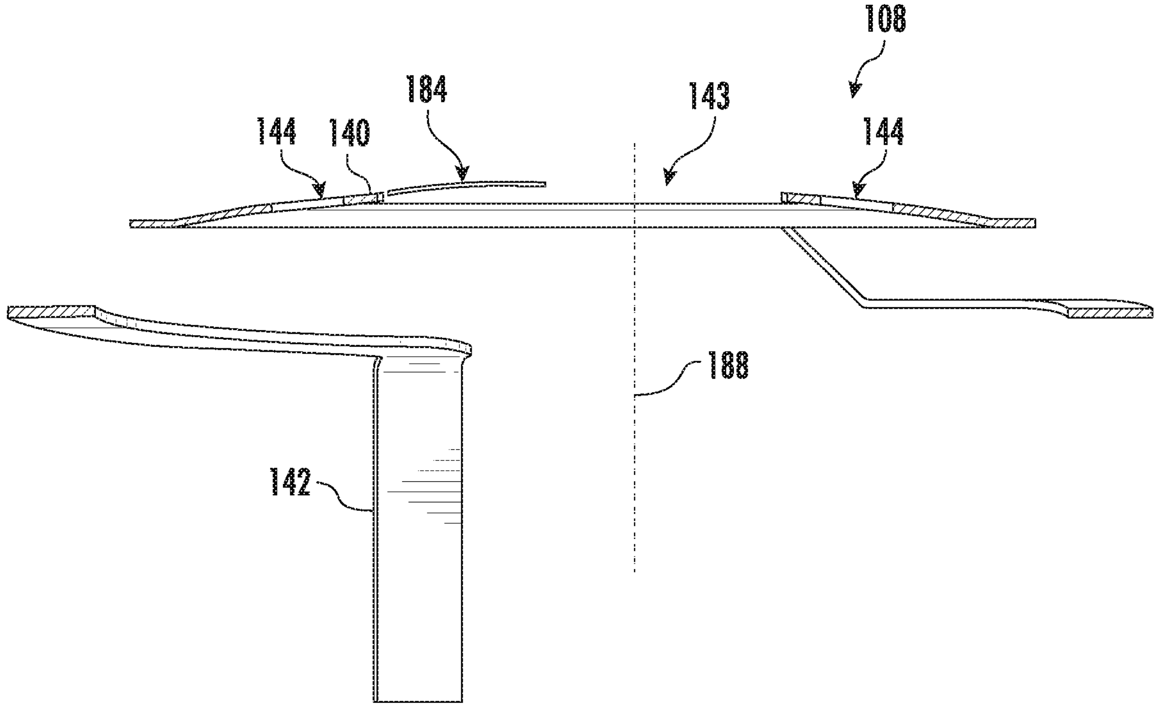
FIG. 11 provides a cutaway side view along Section 11-11 in FIG. 8 of an embodiment of a spring bracket of the sensor support assembly in accordance with aspects of the present disclosure.

Referring particularly to FIG. 9, top wall 107 includes a non-uniform thickness 186 between the upper surface 180 and the lower surface 182. The non-uniform thickness 186 is formed from the upper surface 180 forming a flat or substantially flat surface and the lower surface 182 forming a non-flat surface. The flat upper surface 180 may provide maximum conductive contact with the utensil, such as to promote heat transfer, utensil positioning, and thermostat measurement. In various embodiments, the lower surface 182 includes an angled or curved portion interfacing 184 at which mounting plate 140 abuts the lower surface 182. For instance, referring to FIGS. 11-12, mounting plate 140 includes a contact portion 144 at which the mounting plate 140 contacts the lower surface 182. Referring to FIG. 11, the contact portion 144 includes a curved or toroidal geometry. The lower surface 182 at the corresponding interface to the contact portion 144 forms a curved portion 184. In various embodiments, an angle of the angled portion 184 is greater than zero degrees and up to approximately 60 degrees. However, it should be appreciated that angled portion 184 may include greater acute angles.

Figure 12:
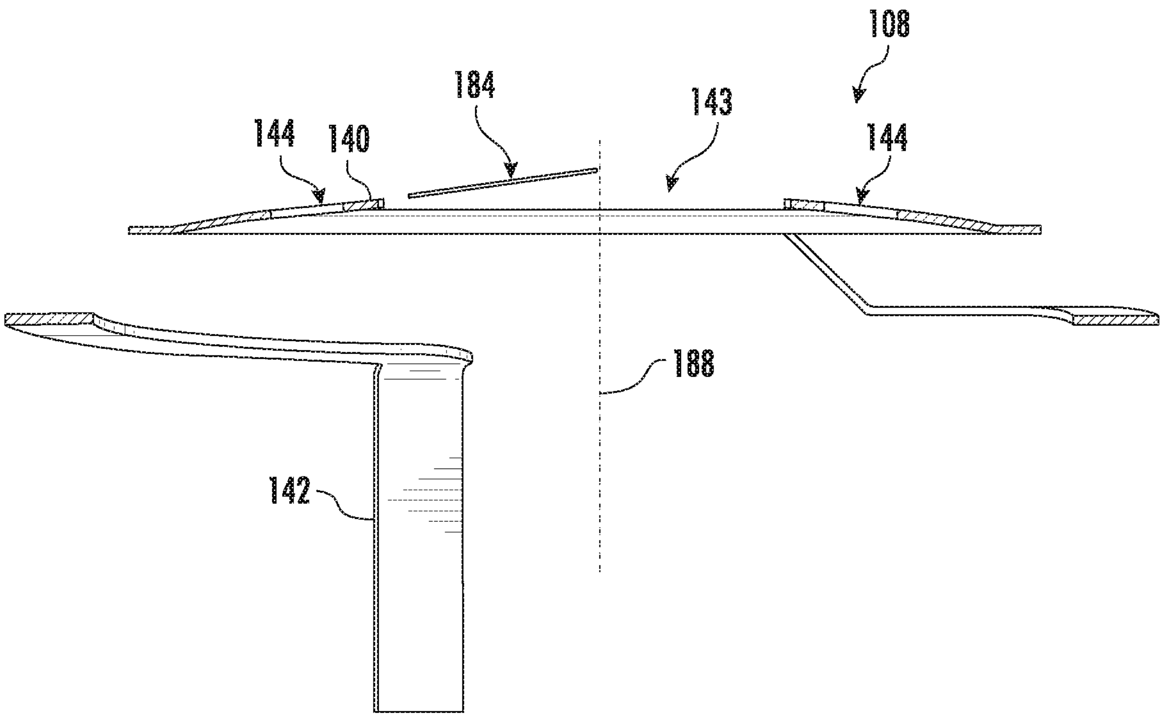
FIG. 12 provides a cutaway side view of an embodiment of a spring bracket of the sensor support assembly along Section 11-11 in FIG. 8 in accordance with aspects of the present disclosure.

Referring to FIG. 12, the contact portion 144 includes a conical or frusto-conical geometry. The lower surface 182 at the corresponding interface to the contact portion 144 forms an angled portion 184 corresponding to the contact portion 144 at the mounting plate 140.

The non-flat interface of the lower surface 182 and mounting plate 140 urges the spring bracket 108 to center, such as relative to reference center axis 188 extending up and down through support assembly 101. The non-flat contact portion 144 and lower surface 182 provide self-centering reaction forces that compress to one another, such as to urge the spring bracket 108 to a center (e.g., concentric alignment with the shroud cover 106) when pressed against the lower surface 182 of the top wall 107.

During assembly, the spring bracket 108 is urged center and rest at a center (e.g., portion 184) of the shroud cover 106. Additionally, in an embodiment of a method for assembly of the sensor support assembly 101, mechanical deformation of the integral rivets causes the angled or curved contact portion 144 and portion 184 to provide centering reaction forces due to the non-flat interfaces, such as to provide a more concentric assembly (e.g., improved concentricity of the spring bracket 108, the shroud cover 106, and thermostat 120) and a mitigate undesired binding of the components and promote positioning of the thermostat 120 for measuring heating coil or utensil temperature.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A heating coil assembly for a cooktop appliance, the heating coil assembly comprising:
- a heating element comprising a coil section;
- a thermostat;
- a sensor support assembly at which the thermostat is positioned, the sensor support assembly comprising:
  - a shroud cover comprising a top wall and a sidewall extending downward from the top wall, the top wall comprising an upper surface facing upward and a non-flat lower surface facing downward toward the thermostat, wherein the upper surface of the shroud cover forms a flat surface; and
  - a spring bracket configured to bias the shroud cover upwardly, the spring bracket comprising a mounting plate and a biasing arm, the spring bracket forming a central recess at which the thermostat is positioned, wherein the mounting plate of the spring bracket comprises a contact portion corresponding to the non-flat surface at the lower surface of the shroud cover.

2. The heating coil assembly of claim 1, wherein the contact portion of the mounting plate forms an angled or curved interfacing portion at which the mounting plate abuts the lower surface.

3. The heating coil assembly of claim 2, wherein the contact portion of the mounting plate and the corresponding non-flat surface at the lower surface of the shroud cover comprises an angle greater than 0 degrees and up to 60 degrees.

4. The heating coil assembly of claim 2, wherein the contact portion forms a conical or frusto-conical geometry.

5. The heating coil assembly of claim 1, wherein the contact portion of the mounting plate is non-flat, and wherein the non-flat contact portion of the mounting plate and the corresponding lower surface of the shroud cover concentrically align the spring bracket relative to a reference centerline of the heating coil assembly.

6. The heating coil assembly of claim 1, wherein the biasing arm extends helically downward from the mounting plate.

7. The heating coil assembly of claim 1, wherein a support stake extends downward from the lower surface, and wherein the thermostat comprises a fastening platform at which a fastener opening is formed, wherein the support stake is configured to extend into the fastener opening.

8. The heating coil assembly of claim 7, the mounting plate comprising an opening through which the support stake is extendable.

9. The heating coil assembly of claim 8, wherein the support stake forms a rivet coupling the spring bracket and thermostat to the shroud cover.

10. The heating coil assembly of claim 1, wherein the shroud cover comprises an aluminum material, a copper material, or alloys thereof.

11. An electric cooktop appliance, the cooktop appliance comprising:
- an electric heating coil assembly comprising a heating element comprising:
- a coil section;
- a thermostat; and
- a sensor support assembly at which the thermostat is positioned, the sensor support assembly comprising:
  - a shroud cover positioned on or above a shroud, the shroud cover comprising a top wall and a sidewall extending downward from the top wall, the top wall comprising a flat upper surface facing upward to contact a utensil on the heating element, the top wall comprising a non-flat lower surface facing downward;
  - a spring bracket configured to bias the shroud cover upwardly toward the utensil, the spring bracket comprising a mounting plate and a biasing arm, the spring bracket forming a central recess at which the thermostat is positioned, wherein the mounting plate of the spring bracket comprises a non-flat contact portion corresponding to the non-flat surface at the lower surface of the shroud cover.

12. The cooktop appliance of claim 11, wherein the contact portion of the mounting plate forms an angled or curved interfacing portion at which the mounting plate abuts the lower surface.

13. The cooktop appliance of claim 12, wherein the contact portion of the mounting plate and the corresponding non-flat surface at the lower surface of the shroud cover comprises an angle greater than 0 degrees and up to 60 degrees.

14. The cooktop appliance of claim 13, wherein the contact portion forms a conical or frusto-conical geometry.

15. The cooktop appliance of claim 11, wherein the contact portion of the mounting plate is non-flat, and wherein the non-flat contact portion of the mounting plate and the corresponding lower surface of the shroud cover concentrically align the spring bracket relative to a reference centerline of the heating coil assembly.

16. The cooktop appliance of claim 11, wherein the biasing arm extends helically downward from the mounting plate.

17. The cooktop appliance of claim 11, wherein a support stake extends downward from the lower surface, wherein the thermostat comprises a fastening platform at which a fastener opening is formed, and wherein the mounting plate comprises a mount plate opening, wherein the support stake is configured to extend into the fastener opening and the mount plate opening to couple the mounting plate and thermostat to the shroud cover.

18. The cooktop appliance of claim 17, wherein the support stake forms a rivet coupling the spring bracket and thermostat to the shroud cover.

19. The cooktop appliance of claim 11, wherein the top wall of the shroud cover comprises a non-uniform thickness between the upper surface and the lower surface.

* * * * *